United States Patent
Faulkner et al.

(10) Patent No.: US 10,575,471 B2
(45) Date of Patent: Mar. 3, 2020

(54) AGRICULTURAL COMBINE WITH REVERSING CHOPPER ROTOR

(71) Applicant: Deere & Company, Moline, IL (US)

(72) Inventors: Christopher J. Faulkner, Eldridge, IA (US); Volker Fuchs, Bettendorf, IA (US); Peter Mischler, Kaiserslautern (DE); Corwin M. Puryk, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 205 days.

(21) Appl. No.: 15/787,664

(22) Filed: Oct. 18, 2017

(65) Prior Publication Data

US 2018/0343805 A1     Dec. 6, 2018

Related U.S. Application Data

(60) Provisional application No. 62/512,709, filed on May 30, 2017.

(51) Int. Cl.
*A01F 29/09*     (2010.01)
*A01F 12/40*     (2006.01)
(Continued)

(52) U.S. Cl.
CPC ........ *A01F 29/095* (2013.01); *A01D 41/1243* (2013.01); *A01F 7/06* (2013.01);
(Continued)

(58) Field of Classification Search
CPC ....... A01D 41/1243; A01F 7/06; A01F 12/40; A01F 29/06; A01F 29/095; A01F 29/12
See application file for complete search history.

(56) References Cited

U.S. PATENT DOCUMENTS 4,804,047 A * 2/1989 Kobashi ............... A01B 33/144
                                                          172/125
6,863,605 B2 * 3/2005 Gryspeerdt ............ A01F 12/40
                                                          460/111
(Continued)

FOREIGN PATENT DOCUMENTS

DE        3644900 A1      10/1987
DE    102015220560    *    4/2017 ............ A01F 12/40
DE    102015220560 A1      4/2017

OTHER PUBLICATIONS

European Search Report issued in counterpart application No. 18173827.9 dated Oct. 31, 2018. (7 pages).

*Primary Examiner* — Alicia Torres
*Assistant Examiner* — Adam J Behrens
(74) *Attorney, Agent, or Firm* — Klintworth & Rozenblat IP LLP

(57) ABSTRACT

An agricultural combine has a chassis that supports a feederhouse receiving cut crop material from an agricultural harvesting head. A rotor and concave arrangement receives the cut crop material to thresh the cut crop material and to separate the cut crop material into a flow of grain and a flow of straw. A cleaning shoe receives the flow of grain from the threshing and separating mechanism to clean the flow of grain and to provide a flow of clean grain and a flow of chaff. A residue management system receives the flow of straw and the flow of chaff. The residue management system has a straw chopper that rotates in a first direction in a windrowing mode to windrow the flow of straw and rotates in a second direction opposite the first direction in a chopping mode to chop the flow of straw.

15 Claims, 7 Drawing Sheets

(51) Int. Cl.
*A01D 41/12* (2006.01)
*A01F 7/06* (2006.01)
*A01F 29/06* (2006.01)
*A01F 29/12* (2006.01)

(52) U.S. Cl.
CPC .............. *A01F 12/40* (2013.01); *A01F 29/06* (2013.01); *A01F 29/12* (2013.01)

(56) References Cited

U.S. PATENT DOCUMENTS

| | | | |
|---|---|---|---|
| 7,717,779 B1 | 5/2010 | Weichholdt et al. | |
| 7,896,732 B2 * | 3/2011 | Benes | A01D 41/1243 460/112 |
| 8,221,203 B1 * | 7/2012 | Flickinger | A01F 29/095 460/112 |
| 10,306,834 B2 * | 6/2019 | Ballegeer | A01F 12/40 |
| 2004/0092298 A1 * | 5/2004 | Holmen | A01D 41/1243 460/111 |
| 2009/0270148 A1 * | 10/2009 | Marvin | A01D 41/12 460/119 |
| 2011/0053669 A1 * | 3/2011 | Weichholdt | A01D 41/1243 460/112 |
| 2016/0135377 A1 * | 5/2016 | Ballegeer | A01D 41/1243 460/112 |
| 2018/0139905 A1 * | 5/2018 | Monteguise | A01F 12/40 |
| 2019/0124849 A1 * | 5/2019 | Farley | A01F 12/40 |

* cited by examiner

AGRICULTURAL COMBINE WITH REVERSING CHOPPER ROTOR

RELATED APPLICATIONS

None.

FIELD OF THE INVENTION

The invention described herein relates to agricultural harvesting. More particularly it relates to agricultural harvesting vehicles. Even more particularly it relates to grain cleaning methods for agricultural harvesters

BACKGROUND OF THE INVENTION

Agricultural combines are self-propelled vehicles that harvest crop materials growing in a field. Internal mechanisms inside combines receive crop plants severed from the ground, thresh them, separate grain from the remainder of the crop plants, and clean the resulting grain.

The threshing and separating mechanisms produce a stream of residue generally called "straw". The cleaning mechanisms produce a secondary stream of residue generally called "chaff".

These two residue streams are typically handled differently inside the combine. The straw can be chopped or not chopped. The straw and/or chaff can be spread widely over the ground, or it can be deposited in a continuous narrow pile immediately behind the combine, generally called a "windrow".

In order to provide this different processing and distribution of residue, various channels or conduits for material flow are provided within the combine itself that can be opened and closed, connected and disconnected by repositioning elements within the combine itself.

In one arrangement, shown in US 2016/0135377 A1, a combine has a straw chopper disposed in an upper rear portion of the combine that rotates in a generally clockwise direction (FIGS. 3-4).

When door 78 is closed, it provides a barrier that extends over the top of the straw chopper and closes off a windrowing channel. This barrier deflects straw (and air from a cleaning fan) over the top of the chopper, downwardly and behind the chopper rotor. The straw is then chopped behind the chopper rotor between a knife and blades extending from the chopper rotor. The chopped straw falls downward behind the chopper rotor and is distributed over the ground.

When door 78 is open, this barrier is removed, and straw and air can flow over the top of the chopper rotor. Straw and air flowing over the top of the chopper rotor flows into a windrowing conduit. Passing through the windrowing conduit, the un-chopped straw is deposited on the ground behind the combine as a windrow.

One problem with this arrangement is that it blocks the free flow of air out of the combine when straw is being chopped. The door 78 blocks the windrowing conduit and prevents air from flowing freely out of the combine when the combine is configured to chop straw. Air (provided by the cleaning fan 52) is the medium that carries the residue through and out the rear of the combine. When it is blocked, it increases the internal pressure inside the combine, reduces the airflow rate, and the operation of the combine is limited.

It would be beneficial to provide greater airflow through the combine than is provided in the prior art.

It is an object of this invention to provide greater airflow.

SUMMARY OF THE INVENTIONS

In accordance with a first aspect of the invention, an agricultural combine comprises: a chassis to support the combine for travel over the ground in an agricultural field harvesting crops; a feederhouse supported on the front of the chassis to receive cut crop material from an agricultural harvesting head; a rotor and concave arrangement supported on the chassis and disposed to receive the cut crop material, to thresh the cut crop material, and to separate the cut crop material into a flow of grain and a flow of straw; a cleaning shoe disposed to receive the flow of grain from the threshing and separating mechanism, to clean the flow of grain and to provide a flow of clean grain and a flow of chaff; and a residue management system disposed to receive the flow of straw and the flow of chaff, wherein the residue management system further comprises a straw chopper that rotates in a first direction in windrowing mode to windrow the flow of straw; and rotates in a second direction opposite the first direction to chop the flow of straw.

The residue management system may further comprise a windrowing conduit downstream of the straw chopper that directs straw from the straw chopper into a windrow.

The residue management system may further comprise a discharge beater that directs the flow of straw leaving the rotor and concave through chopper blades extending from the top of the straw chopper and into the windrowing conduit for deposit on the ground in a windrow.

The residue management system may further comprise a first moveable crop deflector disposed between the rotor and concave and the straw chopper to deflect the flow of straw leaving the rotor and concave through chopper blades extending from the bottom of the straw chopper.

The first movable crop deflector may direct the flow of straw into a bank of stationary counter knives.

The residue management system may further comprise a residue spreader downstream of the straw chopper disposed to broadcast the flow of straw over the ground.

The residue management system may further comprise a discharge beater disposed to receive the flow of straw, and further wherein the flow of straw leaving the discharge beater is directed into a residue distributor to be broadcast over the ground.

The residue management system may further comprise a discharge beater disposed to convey the flow of straw and a first movable crop deflector disposed downstream of the discharge beater (1) to deflect straw downwardly underneath the straw chopper rotor to be chopped between straw chopper blades and a stationary counter knife in a first pivotal position, and (2) to permit straw to pass over a straw chopper rotor and into the windrowing conduit in a second pivotal position.

The residue management system may further comprise a second movable crop deflector disposed in a chaff conduit, wherein the second movable crop deflector is positioned to direct the flow of chaff downward into a residue distributor in a chopping mode of operation, and to open a flow path between a straw chopper and a residue distributor in a windrowing mode of operation.

The residue management system may further comprise an elongate chopper blade pivotally fixed to a chopper mount on the cylinder of a chopper rotor, wherein the chopper blade is generally planar and elongate and has a cutting edge on one end of the chopper blade and a pivotal mount and a mechanical stop on an opposing end of the chopper blade.

The elongate chopper blade may be angularly pivotable with respect to the chopper mount in a one direction from a fully extended position farther than the elongate chopper blade is angularly pivotable in an opposite direction from the fully extended position.

The residue management system may further comprise an exhaust vent in a straw or chaff conduit that is disposed to vent air inside the combine body to the surrounding atmosphere, and the exhaust vent has an inlet upstream of a residue distributor and downstream of a straw chopper and has an outlet outside the combine body.

DETAILED DESCRIPTION OF THE PREFERRED EMBODIMENTS

Figure 1:
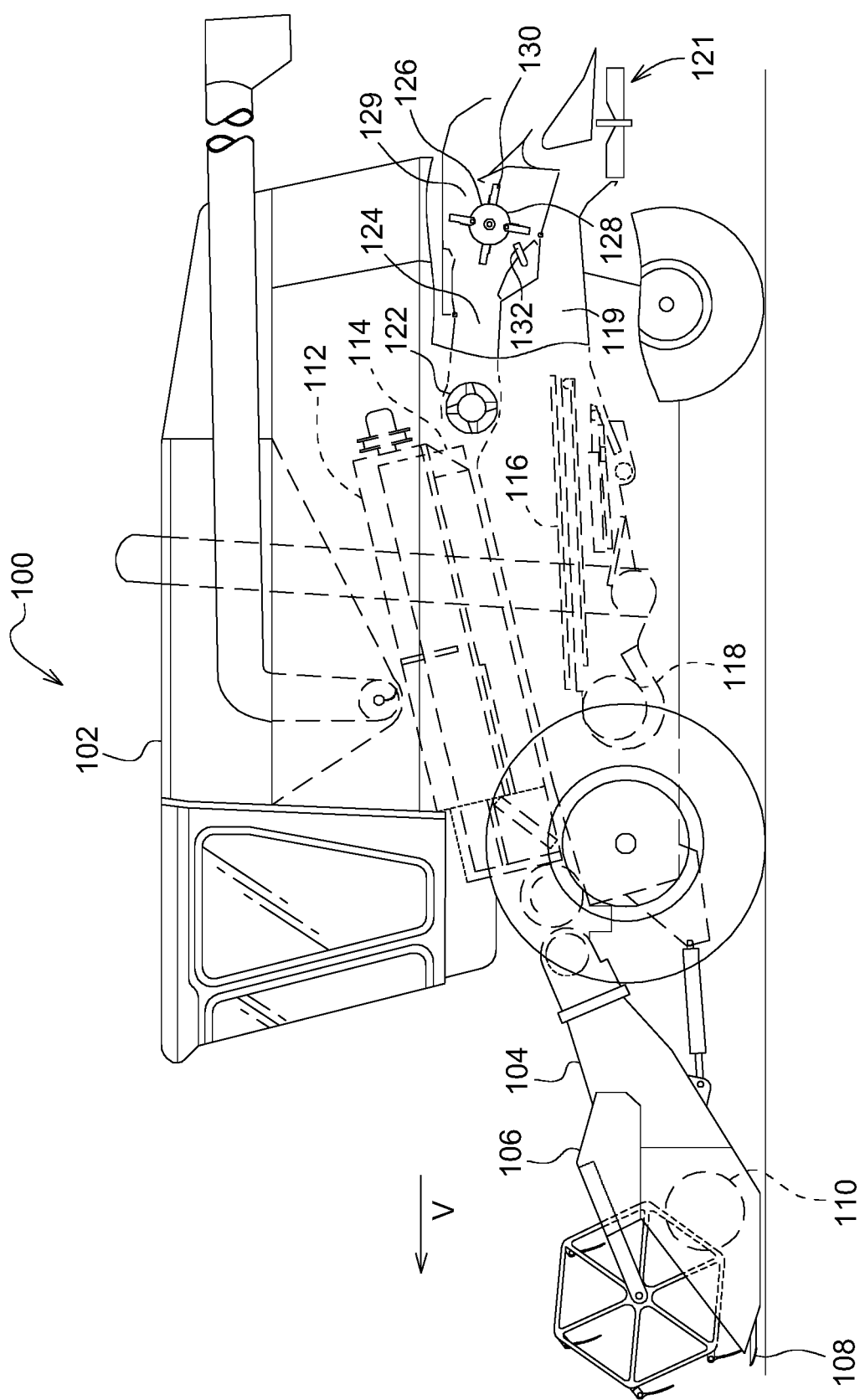
FIG. 1 is a side view of an agricultural combine in accordance with the present invention.

In FIG. 1 an agricultural combine 100 comprises a self-propelled agricultural harvesting vehicle 102 having a feederhouse 104 mounted to and extending forward from the vehicle 102, and an agricultural harvesting head 106 mounted to and extending forward from the front of the feederhouse.

Crops are severed from the ground by an elongate knife 108 that is attached to the lower front edge of the agricultural harvesting head. These crops are carried inward toward a central region of the agricultural combine with a conveyor 110. The crop is then transmitted rearward into the feederhouse 104 and is carried upward in the feederhouse by a conveyor (not shown). The crop is then received into the vehicle 102 and is conveyed between a rotor 112 and a concave grating 114. Crop (i.e. seeds) falls through apertures in the grating 114 and into a cleaning shoe 116 for further cleaning. A cleaning fan 118 mounted at the front of the cleaning shoe 116 blows crop residue separated from the crop in the cleaning shoe (commonly called "chaff") rearward and into a lower residue channel 119 of the residue management system 120. Crop residue that leaves the lower residue channel 119 is directed toward and into a residue distributor 121.

Crop residue that does not pass through the grating 114 (which is commonly called "straw") is conveyed rearwardly between the rotor 112 and the grating 114 until it reaches the end of the rotor and grating at which point the crop residue is forced out from between the rotor and grating. This crop residue is then conveyed into a residue beater 122. Residue beater 122 is in the general form of a laterally extending cylinder to which protrusions extend to engage the crop and carry it rearward. The residue beater 122 accelerates the crop in its rearward travel conveying it through an upper residue channel 124 that is disposed above the lower residue channel 119.

Crop residue that leaves the upper residue channel 124 is directed toward and into a straw chopper 126. The straw chopper 126 is in the general form of elongate laterally extending cylinder 128 to which a plurality of chopper blades 130 are attached (see FIG. 4). The chopper blades 130 are mounted to the cylinder 128 in an evenly distributed pattern around the circumference of the cylinder 128. They are also evenly distributed along substantially the entire length of the cylinder 128.

When the residue management system is configured in a windrowing mode of operation (FIG. 2), substantially all the crop residue passing through the upper residue channel 124 passes over the top of the straw chopper 126 above the top of the cylinder 128 and through the chopper blades 130 that extend outward and upward from the top of the cylinder 128. It is received in a residue windrowing conduit 129 that extends over the top of the residue distributor 121. Crop residue passing through the windrowing conduit 129 is released at the rear of the vehicle 102 above the residue distributor 121 and subsequently falls upon the ground to create a windrow of straw behind the vehicle 102.

When the residue management system is configured in a chopping mode of operation (FIG. 3), substantially all the crop residue passing through the upper residue channel 124 is directed downward, underneath the bottom of the cylinder 128 and through the chopper blades 130 that extend downward and outward from the lower surface of the cylinder 128. It then passes into the residue distributor 121 which spreads the crop residue laterally (i.e. side to side) and over the same width of the ground as the width of the agricultural harvesting head 106.

Crop residue passing downward, underneath the bottom of the cylinder 128 in the chopping mode of operation (FIG. 3) engages stationary counter knife 132. The stationary counter knife 132 includes upwardly extending blades 134 that pass between opposing chopper blades 130 on the cylinder 128. As the chopper blades 130 and the chopper blades 130 pass between each other, the crop residue is chopped (i.e. severed into short portions). The blades 134 extend inwardly through slots in the wall 135 and are fixed to an elongate bar 137 that can be manually positioned to adjust the blades, permitting a greater or lesser amount of the blades to extend through the wall 135.

After it has been chopped, the crop residue passes downward, rearward and into the residue distributor 121 which receives both the chopped residue and the chaff and spent them widely over the ground.

Windrowing Mode of Operation:

In the windrow mode of operation, the crop residue is separated into two distinct flow paths, one path for straw, and one for chaff. The upper residue channel 124 receives the straw which passes out through the rear of the rotor/concave arrangement, accelerates it and beats it in the residue beater 122, further accelerates it as it passes over the top of the chopper rotor, and conveys it to the rear of the combine through the residue windrowing conduit 129, whereupon it falls on the ground in a narrow swath called a "windrow".

At the same time, and in the same mode of operation, crop residue separated from the crop in the cleaning shoe (i.e. "chaff") is conveyed rearward through a separate path—the lower residue channel 119—then into the residue distributor 121, and thence is spread over the ground.

This dual path windrowing mode of operation spreads the chaff widely over the ground behind the combine and concentrates the straw in a narrow windrow directly behind the combine where it can be later gathered for other purposes.

Chopping Mode of Operation:

In the chopping mode of operation, the crop residue is separated into two distinct flow paths, one for straw, and one for chaff. The straw, following its separate path, is directed into the chopper and underneath the chopper where it is chopped. The chopped straw is then directed into the residue distributor 121 where it rejoins the chaff, and both the chaff and the chopped straw our mixed together, and are distributed widely over the ground.

Figure 2:
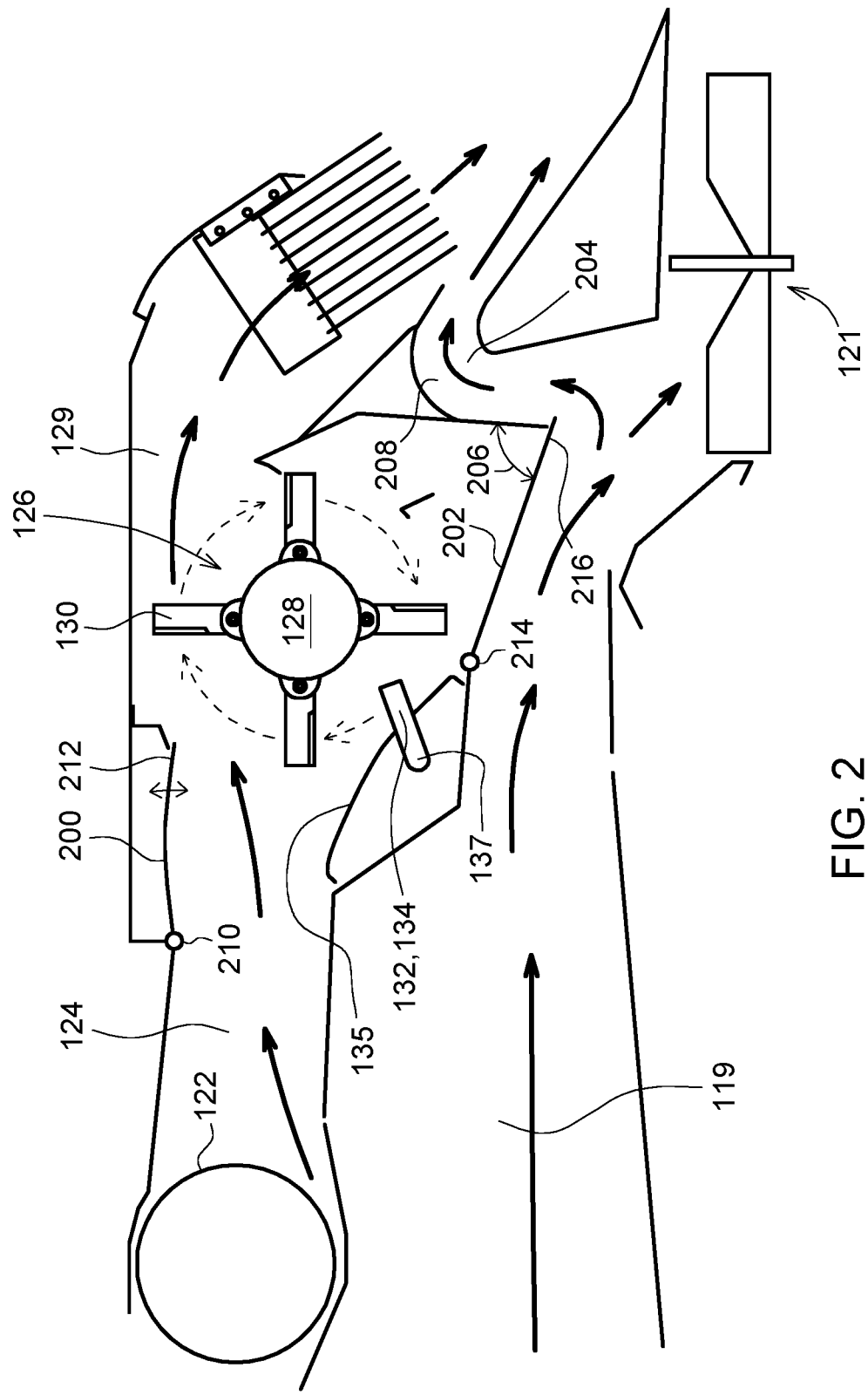
FIG. 2 shows a residue management system of the agricultural combine of FIG. 1 configured in in a windrower mode of operation.
Figure 3:
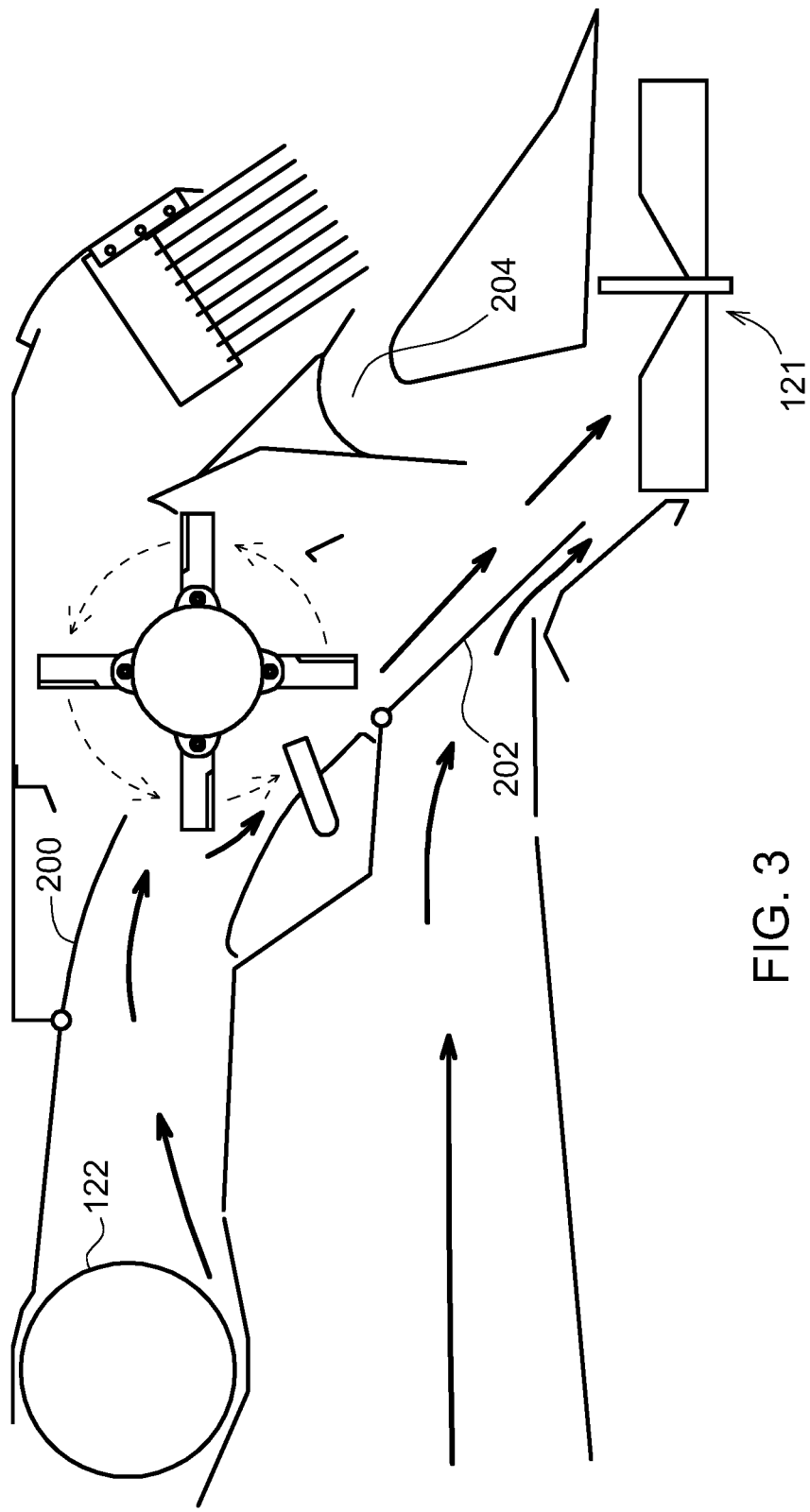
FIG. 3 shows the residue management system configured in a spreader mode of operation.

These two separate modes of operation are illustrated in FIGS. 2 and 3.

FIG. 2 shows the windrowing mode of operation. In FIG. 2, a first movable crop deflector 200 disposed upstream of the straw chopper 126 is in a retracted position in which it permits straw thrown rearward from the residue beater 122 to be conveyed upward through a channel extending over the top of the straw chopper 126. In this mode of operation, the straw chopper 126 is driven in a first direction (i.e. clockwise in FIG. 2) in which the chopper blades 130 extending from the top of the straw chopper 126 are moving together with the straw in a rearward direction such that all or substantially all of the straw passes over the top of the chopper rotor. Preferably, the chopper blades 130 are traveling faster than the straw itself and thereby accelerate the straw passing over the top of the chopper rotor.

A second movable crop deflector 202 is positioned in a retracted position in which the lower residue channel 119 is enlarged to permit easier flow of air and chaff into the residue distributor 121, while at the same time reducing or eliminating the flow of any straw that has fallen down underneath the straw chopper 126 in the windrowing mode of operation.

To further enhance the free flow of air leaving the interior of the combine, an exhaust air path 204 is provided just upstream of the residue distributor 121. This exhaust air path 204 permits air to reverse direction, pass over the top of the residue distributor 121 and escape the combine in a rearward direction. The air passing through exhaust air path 204 is directed into and mixed with the straw passing through the upper residue channel 124 to further accelerate the straw leaving the rear of the combine and forming a windrow.

In order to keep the chaff passing into the residue distributor 121 while permitting the air mixed with the chaff to pass through the exhaust air path 204 and mix with the straw, the exhaust air path 204 extends upward from the lower residue channel 119 at a sharp angle 206. The inertia of the chaff tends to carry it past the exhaust air path 204 and into the residue distributor 121. The air, however, can more easily reverse its flow direction and travel upward to the exhaust air path 204.

The air passing upward into the exhaust air path 204 is preferably turned so that it is directed rearward and/or downward and is traveling in substantially the same direction as the straw leaving the upper residue channel 124 when the air and the straw are rejoined. To do this, a sharp bend 208 is provided in the exhaust air path 204 to redirect the air rearward and downward.

The first movable crop deflector 200 is in the form of a generally rectangular panel that extends substantially the entire lateral width of the upper residue channel 124 and that is pivotally mounted along its upstream (i.e. forward) edge 210 adjacent to the top of the upper residue channel 124 to pivot up and down at its downstream (i.e. rear) edge 212. In the windrowing mode of operation, the first movable crop deflector 200 is pivoted upward to allow free flow of crop and air through the upper residue channel 124, over the top of the straw chopper 126 and through the chopper blades 130 extending upward from the top of the cylinder 128. Straw that enters the region of the straw chopper 126 along the lower trajectory, will be lifted up by chopper blades 130 that extend from the upstream (i.e. forward) portion of the cylinder 128.

The second movable crop deflector 202 is in the form of a generally rectangular panel that extends substantially the entire lateral width of the lower residue channel 119 and that is pivotally mounted along its upstream (i.e. forward) edge 214 adjacent to the top of the lower residue channel 119 to pivot up and down at its downstream (i.e. rear) edge 216. In the windrowing mode of operation, the second movable crop deflector 202 is pivoted upward to allow free flow of chaff mixed with air into the residue distributor 121 while reducing or eliminating the small amount of straw that might otherwise fall from the upper residue channel 124, through the underside of the straw chopper 126 and downward into the lower residue channel 119.

The residue distributor 121 (often called a "spreader") is disposed to steer crop to the left and to the right as it leaves the rear of the combine. In one form it is a collection of curved vanes. In another form (shown here) it is two circular discs disposed side-by-side with fan blades or vanes extending upward or downward therefrom that rotate about and are driven by a driveshaft. The driveshaft, in turn, is driven in rotation by a motor (not shown).

FIG. 3 shows the chopping mode of operation. In FIG. 3, the first movable crop deflector 200 is in its lowered, deflecting position in which it directs straw thrown rearward from the residue beater 122 to be conveyed downward, underneath the cylinder 128 and through the chopper blades 130 extending from the bottom of the cylinder 128. As described above, this causes the straw to be chopped and directed into the residue distributor 121 where it mixes with the chaff, and is spread over the ground. In this mode of operation, the straw chopper 126 is driven in a second direction opposite the first direction (i.e. counterclockwise in FIG. 3) such that the chopper blades 130 tend to knock the straw downward, underneath the cylinder 128 and through the chopper blades 130 extending from the bottom of the cylinder 128. Preferably the chopper blades 130 are traveling faster than the straw itself and thereby accelerate the straw passing underneath the cylinder 128 and through the chopper blades 130 that extend from the bottom of the cylinder 128.

Thus, the different directions of rotation of the straw chopper 126 in the different modes of operation function to direct the straw either upward over the top of the straw chopper cylinder 128 (in the windrowing mode) and into a windrowing path to create a narrow windrow, or downward under the straw chopper cylinder 128 (in the chopping mode) and into the residue distributor 121 to distribute the chopped straw widely over the ground.

Figure 4:
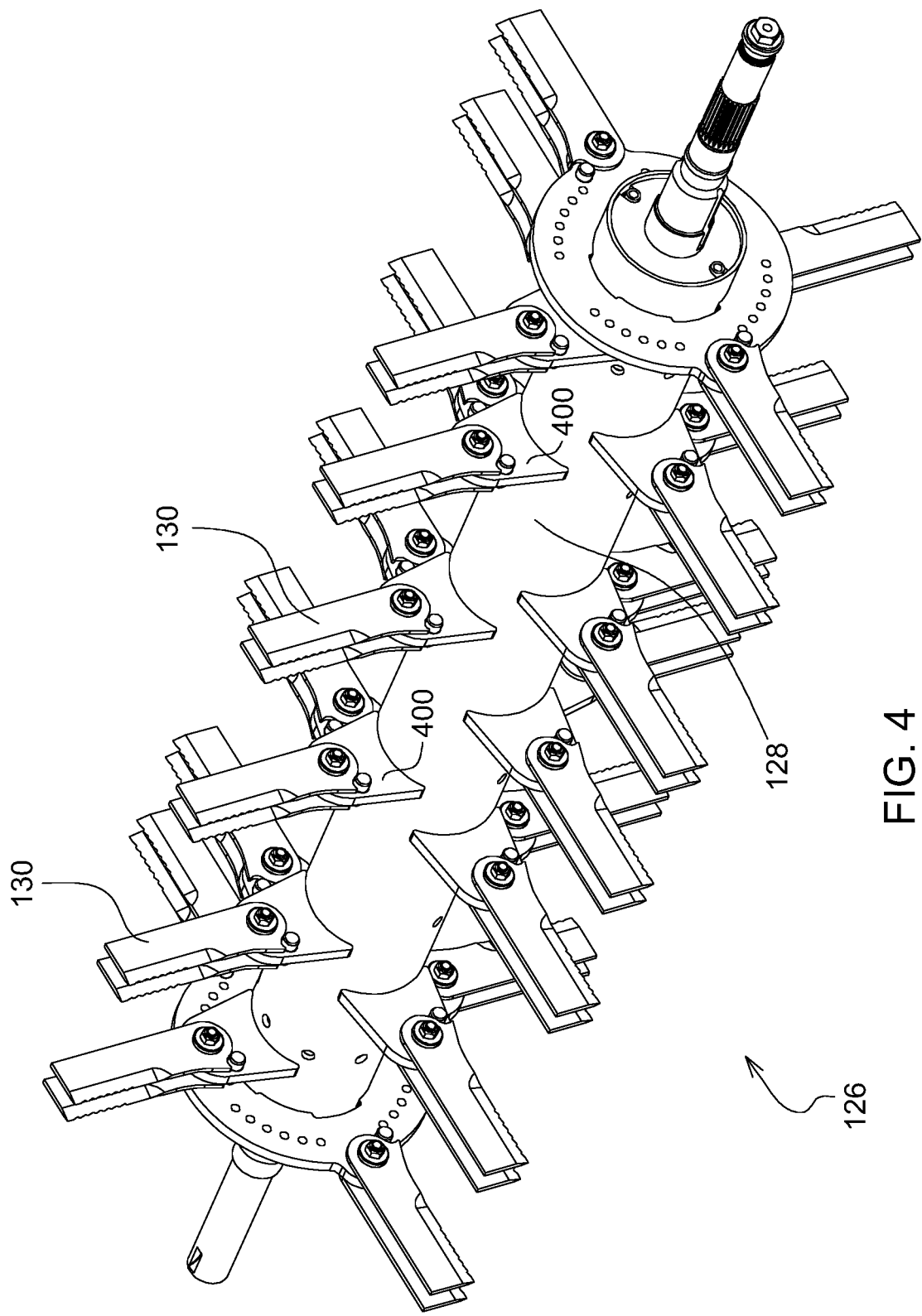
FIG. 4 shows the chopper rotor and chopper blades of the residue management system of the foregoing figures.
Figure 5:
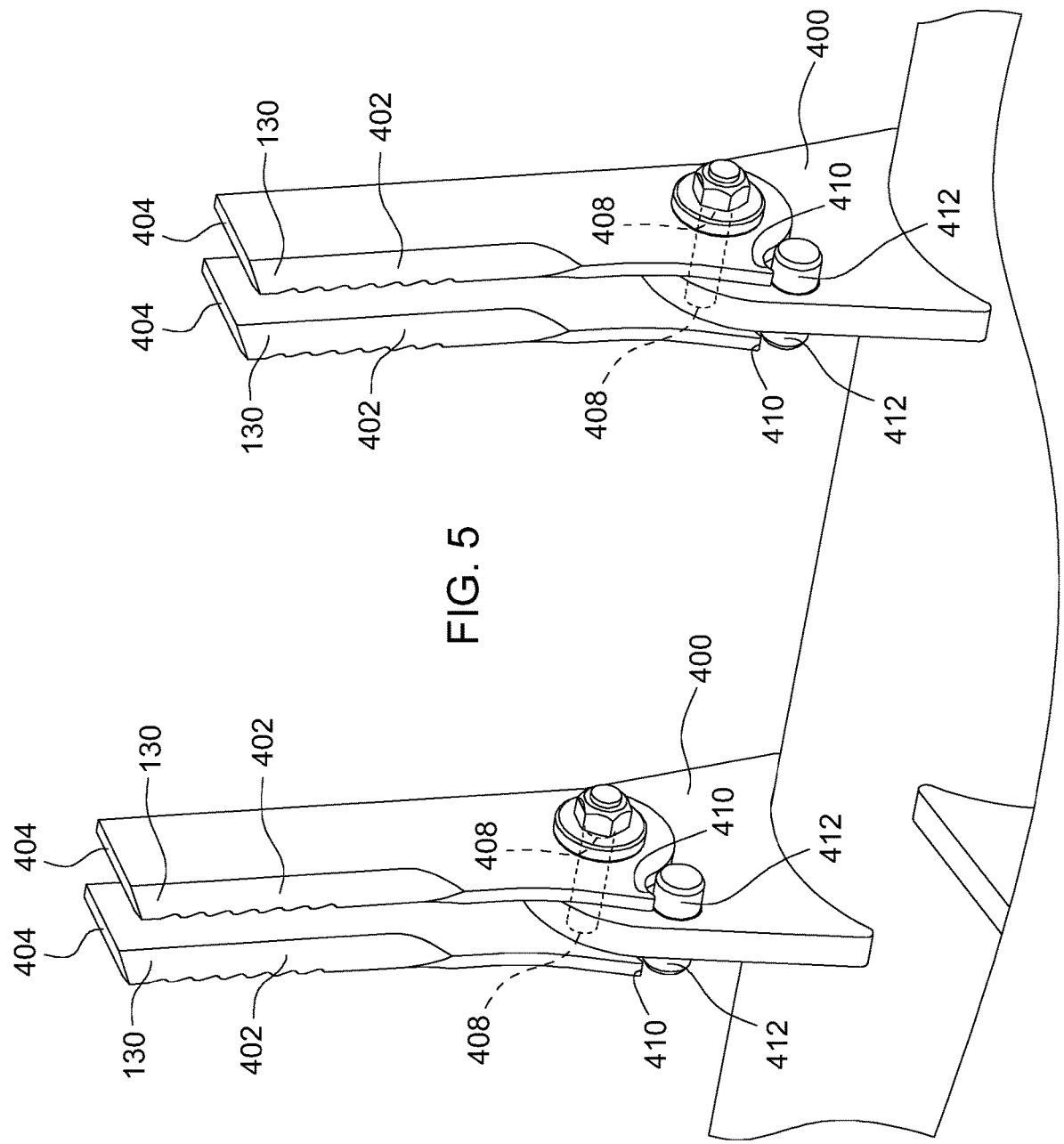
FIG. 5 is a detailed fractional front perspective view of the chopper rotor and chopper blades of the foregoing figures.
Figure 6:
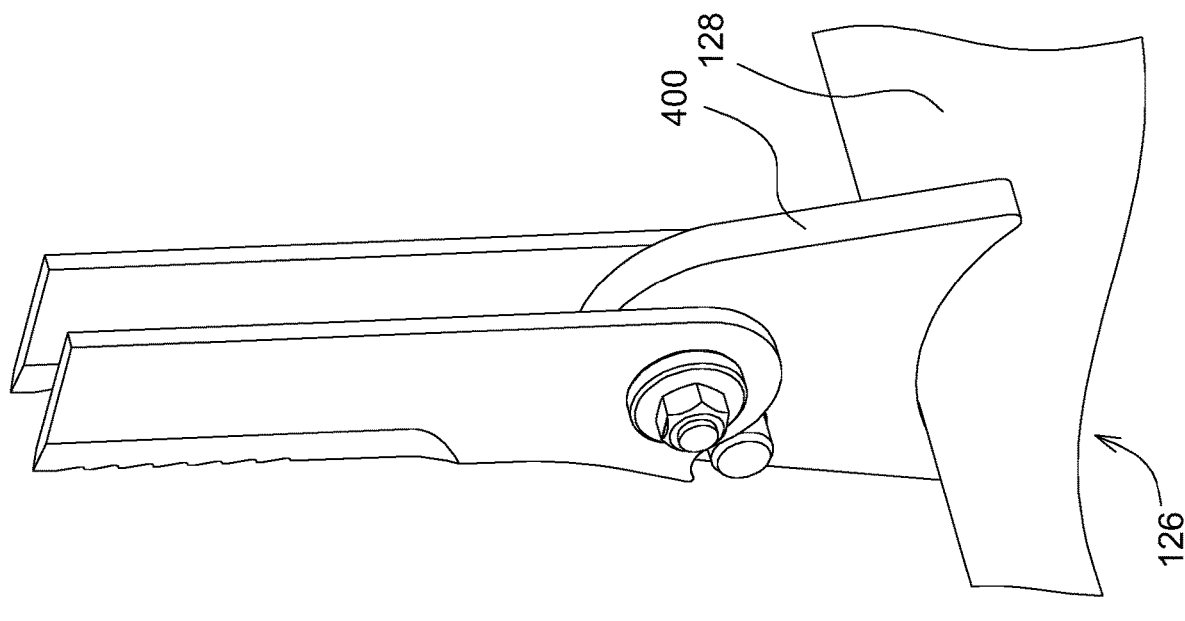
FIG. 6 is a detailed fractional rear perspective view of the chopper rotor and chopper blades of the foregoing figures.

The straw chopper 126 and the chopper blades 130 are specially configured to assist in these different functions. Referring now to FIG. 4, the cylinder 128 is an elongate cylinder with a plurality of blade mounts 400 fixed to and extending outward from the surface of the cylinder 128. They are distributed evenly along the length and around the circumference of the cylinder 128. Each of these blade mounts 400 is pivotally coupled to a to corresponding chopper blades 130, with one chopper blade 130 on one side of a blade mount 400 and another chopper blade 130 on the other side of the blade mount. Each chopper blade 130 has a hole 408 at its inner end adjacent to the cylinder 128 that aligns with a corresponding hole in the blade mount 400. A fastener (typically a bolt/nut combination) extends through these holes and holds the two blades 130 to each mount 400. The fastener permits the blades 130 to pivot with respect to the mount 400. The chopper blades 130 themselves are formed generally is a thin plate lying in a plane perpendicular to the rotational axis of the cylinder 128. Each chopper blade 130 has a cutting edge 402 extending generally from the outer end 404 of the blade to a position adjacent to a longitudinal midpoint 406 of the blade.

A mechanical stop 410 is fixed to the blade adjacent to its blade mount 400. This mechanical stop 410 is positioned to abut a corresponding mechanical stop 412 on the blade mount 400.

When the chopper rotor is rotating in the windrowing mode of operation and hits straw entering the straw chopper 126, the mechanical stops 410, 412 abut each other and ensure that the chopper blade 130 remains in a substantially extended position, capable of sweeping the straw upward and over the top of the straw chopper 126.

When the chopper rotor is rotating in the chopping mode of operation, however, the mechanical stops 410, 412 do not abut each other, and permit the chopper blade 130 pivot much farther with respect to the cylinder 128. This permits the chopper blade 130 to pivot out of the way of the stationary counter knife 132 in the event that a large lump of straw becomes jammed between the chopper blades 130 and the stationary counter knife 132.

Thus, by providing the stops 410, 412 the chopper blades 130 can pivot farther with respect to their mounts 400 in one direction than they can in the other direction.

Figure 7:
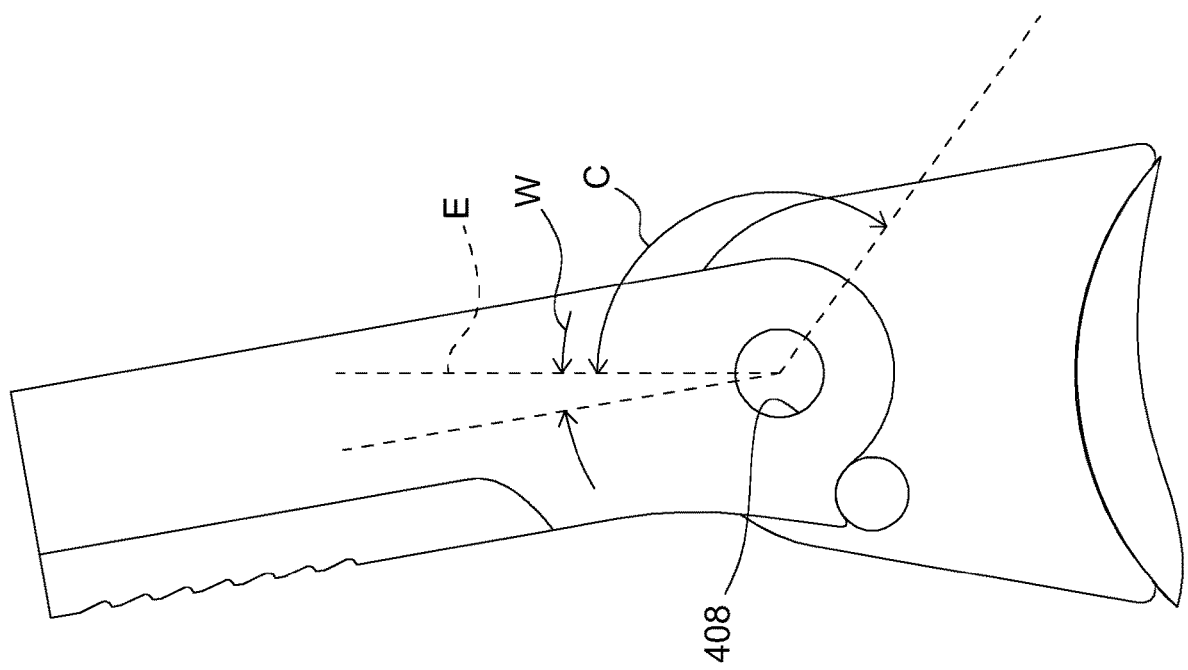
FIG. 7 is a side view of a chopper blade and a chopper blade mount.

This relationship is illustrated in FIG. 7, in which the chopper blade 130 extends straight outward from a blade mount 400 in a direction E. This is typically the position of the chopper blade 130 when the straw chopper cylinder 128 is spinning freely, meeting no resistance from straw or chaff.

The chopper blade 130 can be pivoted toward the stop through an angle "W" while operating in the windrowing mode. This would happen, for example, when the chopper blade 130 collides with straw. After the chopper blade has pivoted through the angle "W" with respect to the blade mount 400, the two stops abut each other, and the chopper blade 130 can pivot no further relative to the blade mount 400 in that direction. The angle "W" is preferably between 0 and 30°. More preferably it is between 5 and 15°. More preferably it is between 8 and 12°.

The chopper blade 130 can be pivoted away from the stop through an angle "C" while operating in the chopping mode. This would happen, for example, when the chopper blade collides with straw or straws jammed between the chopper blade 130 and the stationary counter knife 132. When this happens, it is desirable that the blade pivots through a significant angle with respect to the blade mount 400 to avoid damage to the chopper blade 130 or the blade mount 400. As shown, the chopper blade 130 can pivot to an angle "C" while operating in the chopping mode. Angle "C" is preferably between 30 and 120°. More preferably it is between 40 and 100°. More preferably, it is between 50 and 90°.

The invention claimed is:
1. An agricultural combine comprising:
a chassis to support the combine for travel over the ground in an agricultural field harvesting crops;
a feederhouse supported on the front of the chassis to receive cut crop material from an agricultural harvesting head;
a rotor and concave arrangement supported on the chassis and disposed to receive the cut crop material, to thresh the cut crop material, and to separate the cut crop material into a flow of grain and a flow of straw;
a cleaning shoe disposed to receive the flow of grain from the threshing and separating mechanism, to clean the flow of grain and to provide a flow of clean grain and a flow of chaff;
a residue management system disposed to receive the flow of straw and the flow of chaff, wherein the residue management system further comprises a straw chopper that rotates in a first direction in a windrowing mode to windrow the flow of straw and rotates in a second direction opposite the first direction in a chopping mode to chop the flow of straw; and
a first moveable crop deflector disposed between the rotor and concave arrangement and the straw chopper to deflect the flow of straw leaving the rotor and concave arrangement in front of the straw chopper.

2. The agricultural combine of claim 1, wherein the residue management system further comprises a windrowing conduit downstream of the straw chopper that directs straw from the straw chopper into a windrow.

3. The agricultural combine of claim 2, wherein the residue management system further comprises a discharge beater that directs the flow of straw leaving the rotor and concave arrangement through chopper blades extending from a top of the straw chopper and into the windrowing conduit for deposit on the ground in a wind row.

4. The agricultural combine of claim 3, wherein the first moveable crop deflector deflects the flow of straw leaving the discharge beater through chopper blades extending from a bottom of the straw chopper.

5. The agricultural combine of claim 4, wherein the first moveable crop deflector directs the flow of straw into a bank of stationary counter knives.

6. The agricultural combine of claim 5, further comprising a residue spreader downstream of the straw chopper disposed to broadcast the flow of straw over the ground.

7. The agricultural combine of claim 6, further comprising a discharge beater disposed to receive the flow of straw, and further wherein the flow of straw leaving the discharge beater is directed into the residue spreader to be broadcast over the ground.

8. An agricultural combine comprising:
a chassis to support the combine for travel over the ground in an agricultural field harvesting crops;
a feederhouse supported on the front of the chassis to receive cut crop material from an agricultural harvesting head;
a rotor and concave arrangement supported on the chassis and disposed to receive the cut crop material, to thresh the cut crop material, and to separate the cut crop material into a flow of grain and a flow of straw;
a cleaning shoe disposed to receive the flow of grain from the threshing and separating mechanism, to clean the flow of grain and to provide a flow of clean grain and a flow of chaff;
a residue management system disposed to receive the flow of straw and the flow of chaff, wherein the residue management system further comprises a straw chopper that rotates in a first direction in a windrowing mode to windrow the flow of straw and rotates in a second direction opposite the first direction in a chopping mode to chop the flow of straw; and a first movable crop deflector disposed downstream of a discharge beater (1) to deflect straw downwardly underneath the straw chopper rotor to be chopped between straw chopper blades and a stationary counter knife in a first pivotal position and (2) to permit straw to pass over a straw chopper rotor and into a windrowing conduit in a second pivotal position.

9. The agricultural combine according to claim 4, further comprising a second movable crop deflector disposed in a chaff conduit, wherein the second movable crop deflector is positioned to direct the flow of chaff downward into a residue distributor in the windrowing mode of operation and to open a flow path between the straw chopper and the residue distributor in the chopping mode of operation.

10. The agricultural combine according to claim 1, wherein the straw chopper has an elongate chopper blade pivotally fixed to a chopper mount on a cylinder of a chopper rotor, wherein the chopper blade is generally planar and elongate and has a cutting edge on one end of the chopper blade and a pivotal mount and a mechanical stop on an opposing end of the chopper blade.

11. The agricultural combine according to claim 10, wherein the elongate chopper blade is angularly pivotable with respect to the chopper mount in one direction from a fully extended position farther than the elongate chopper blade is angularly pivotable in an opposite direction from the fully extended position.

12. An agricultural combine having a combine body comprising:

a chassis to support the combine for travel over the ground in an agricultural field harvesting crops;

a feederhouse supported on the front of the chassis to receive cut crop material from an agricultural harvesting head;

a rotor and concave arrangement supported on the chassis and disposed to receive the cut crop material, to thresh the cut crop material, and to separate the cut crop material into a flow of grain and a flow of straw;

a cleaning shoe disposed to receive the flow of grain from the threshing and separating mechanism, to clean the flow of grain and to provide a flow of clean grain and a flow of chaff;

a residue management system disposed to receive the flow of straw and the flow of chaff, wherein the residue management system further comprises a straw chopper that rotates in a first direction in a windrowing mode to windrow the flow of straw and rotates in a second direction opposite the first direction in a chopping mode to chop the flow of straw; and an exhaust vent in a straw or chaff conduit that is disposed to vent air inside the combine body to the surrounding atmosphere, and wherein the exhaust vent has an inlet upstream of a residue distributor and downstream of the straw chopper and has an outlet outside the combine body.

13. The agricultural combine according to claim 1, wherein the chopper is rotatable in the first direction in the windrowing mode to lift the flow of straw over the top of the chopper and convey it rearwardly.

14. The agricultural combine according to claim 13, wherein the chopper is rotatable in the second direction in the chopping mode to direct the flow of straw downward on the front side of the chopper and toward a stationary counter knife.

15. The agricultural combine according to claim 14, wherein the stationary counter knife has blades that interengage with blades extending from the chopper.

* * * * *

UNITED STATES PATENT AND TRADEMARK OFFICE
CERTIFICATE OF CORRECTION

PATENT NO. : 10,575,471 B2
APPLICATION NO. : 15/787664
DATED : March 3, 2020
INVENTOR(S) : Faulkner et al.

Page 1 of 1

It is certified that error appears in the above-identified patent and that said Letters Patent is hereby corrected as shown below:

In the Claims

In Column 8, Claim 3, Line 33, delete "wind row." and insert -- windrow. --, therefor.

Signed and Sealed this
Twenty-sixth Day of May, 2020

Andrei Iancu
*Director of the United States Patent and Trademark Office*